Figure 1:
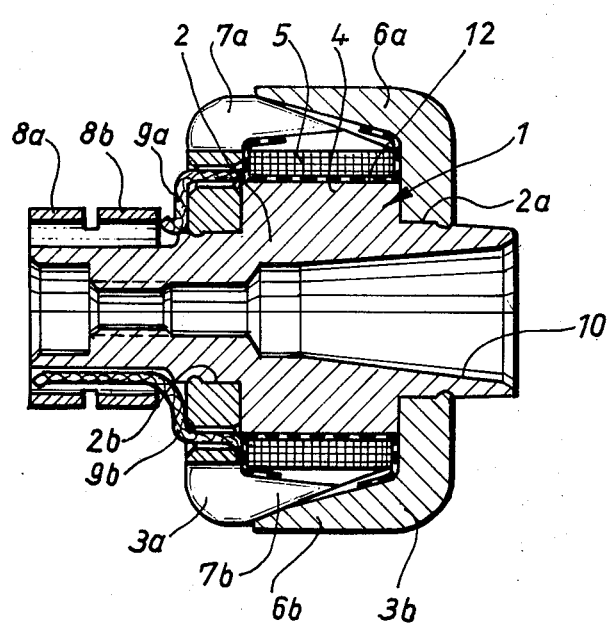

United States Patent [19]

Kreuzer

[11] 4,228,377

[45] Oct. 14, 1980

[54] ROTOR STRUCTURE FOR DYNAMO ELECTRIC MACHINES SUBJECT TO VIBRATORY, SHOCK, OR TEMPERATURE CHANGE EFFECTS

[75] Inventor: Helmut Kreuzer, Schwieberdingen, Fed. Rep. of Germany

[73] Assignee: Robert Bosch GmbH, Stuttgart, Fed. Rep. of Germany

[21] Appl. No.: 20,237

[22] Filed: Mar. 13, 1979

[30] Foreign Application Priority Data

Mar. 16, 1978 [DE] Fed. Rep. of Germany ....... 2811323

[51] Int. Cl.³ ............................................. H02K 1/22
[52] U.S. Cl. ..................................... 310/263; 310/51; 310/45
[58] Field of Search ................. 310/263, 51, 261, 262, 310/264–267, 269, 270, 45, 179, 180, 193, 194, 71, 195, 214, 215, 216

[56] References Cited

U.S. PATENT DOCUMENTS

| | | | |
|---|---|---|---|
| 2,795,715 | 6/1957 | Gilchrist | 310/263 X |
| 3,230,404 | 1/1966 | Graham | 310/263 X |
| 3,305,740 | 2/1967 | Shano | 310/263 X |
| 3,423,619 | 1/1969 | Shaw | 310/263 |
| 3,671,906 | 6/1972 | Hodges et al. | 310/263 X |

FOREIGN PATENT DOCUMENTS

373818  5/1973  U.S.S.R. ................................... 310/263

Primary Examiner—Mark O. Budd
Attorney, Agent, or Firm—Frishauf, Holtz, Goodman & Woodward

[57] ABSTRACT

To reliably place a winding on a cylindrical pole core of a claw pole rotor structure for an alternator subjected to extremes in shock, vibration and oscillatory loadings, for example for use with motorcycle alternators, the pole core is deformed by knurling, grooving, rifling, or the like, preferably extending in cross direction, and a layer of mesh or net structure insulating fabric material, preferably a linen mesh, is placed over the pole core, the woven fabric mesh structure mechanically interlocking with the deformations and projections on the surface of the rotor; preferably, a plurality of wraps of the layer are provided, the field winding being wound directly over the uppermost wrap of the fabric layer in the form of a toroidal winding and, after assembly with the claw poles, the entire structure is impregnated with a suitable insulating compound, for example by vacuum impregnation, in accordance with standard dynamo electric machine construction.

16 Claims, 2 Drawing Figures

ROTOR STRUCTURE FOR DYNAMO ELECTRIC MACHINES SUBJECT TO VIBRATORY, SHOCK, OR TEMPERATURE CHANGE EFFECTS

REFERENCE TO RELATED APPLICATIONS

U.S. Ser. No. 22,283, filed Mar. 20, 1979, BINDER; U.S. Ser. No. 37,504, filed May 10, 1979, BINDER, both assigned to the assignee of the present application.

The present invention relates to dynamo electric machines, and more particularly to the rotor construction for dynamo electric machines in which the overall dynamo electric machine is subject to substantial vibration, shock or the like. The rotor construction is especially applicable for use in bearingless alternators for automotive application, in which the rotor is supported only by the output shaft of a prime mover, for example the shaft of an internal combustion engine for use on motorcycles.

BACKGROUND AND PRIOR ART

Even small internal combustion engines, for example for use on motorcycles, scooters, snowmobiles or the like are coupled to dynamo electric machines of the three-phase alternating current generator type, the output of the alternator being controlled by a voltage regulator as well known in connection with automotive-type alternators to supply current to loads which may include a battery. Three-phase alternators for use on motorcycles or the like are subject to substantial shock and vibration. The armature, usually on the stator of the alternator, is wound in three-phase winding, operated either in star or delta connection. The rotor has a field winding thereon, the current through which is controlled by the voltage regulator in order to control the output voltage derived from the three-phase alternator. The output voltage is rectified in a suitable bridge rectifier for supply of current to loads at a substantially level output voltage.

The rotor is usually so constructed that a cylindrical core has a toroidal field winding wound thereon. To form the respective magnetic poles of the field winding, interdigited pole shoes are connected to the end portions of the essentially cylindrical pole core. The overall assembly of pole core, winding thereon, and interdigited or claw pole shoes which extend from the axial end together form the rotor construction. This rotor construction can be supported in bearings specially arranged therefor on the shell, for example the end bells of the alternator; in other constructions, the rotor is formed with an engagement surface, for example a tapering bore or a tapering stub which fits directly on the output shaft of the prime mover—for example a motor cycle engine crankshaft—to be supported entirely by the bearings of the prime mover itself. The rotor can be connected to any prime mover which may also be a shaft on transmission gearing or other source of rotary energy. The field current through the winding is conducted thereto by means of brushes which engage slip rings on the rotor, the current intensity itself being controlled by a suitable voltage regulator.

Rotors of this type which are essentially directly driven from a prime mover, and particularly if journalled in a remote bearing, are frequently subject to substantial vibration and shock; the rotor assembly must be so constructed that it is resistant to all such vibrations and shocks and, additionally, is resistant to rotary oscillations. It has been found that, particularly in remotely journalled rotors, the field winding may loosen with respect to the rotor core; this will, eventually, lead to break of the connecting wires and thus failure of the entire alternator itself. These difficulties are particularly apparent when rotors are remotely journalled and connected to motorcycle engines since the vibration, rotary oscillation, and shock loading of dynamo electric machines used on motorcycles are particularly severe. Additionally, wide swings in temperature and temperature gradients within the dynamo electric machine itself places substantial requirements of mechanical strength on the alternator structure.

It has previously been proposed to utilize separate winding forms to place the field structure on the rotor and to anchor the field structure thereto. Winding forms coupled with insulating disks have been used; still, however, the integrity of the overall rotor construction required for application under extreme conditions of temperature gradients, vibration and shock could not be obtained.

THE INVENTION

It is an object to provide a dynamo electric machine and more specifically a rotor construction therefor which is reliable in operation although subjected to extremes in vibration, shock, rotary oscillations, and other non-uniform operating requirements, while also being essentially unaffected by extremes in temperature variations to which the entire machine is subjected, as well as to temperature gradients within the structure itself.

Briefly, the pole core, preferably an essentially cylindrical structure, is formed wiht a serrated, knurled, notched or grooved surface configuration. An insulating fabric structure is applied to this surface, the fabric being woven or applied in crossing direction so that the yarns of the fabric, typically canvas using linen threads, can fit within the grooves or notches formed by the knurled, serrated or otherwise deformed surface of the pole core. Several wraps of such fabric, preferably, are applied over the core and the winding is then wound over the fabric layer.

In accordance with a preferred feature of the invention, the winding structure is formed into an integrated whole by adhesives, or the like, for example by vacuum impregnation of the assembly of the pole core, pole shoes and the fabric and winding thereon.

The structure has the advantage that the connection between the core of the pole, that is, the cylindrical core element and the winding is reliable and sturdy, since the intermediate fabric weave is not only adhesively but additionally mechanically connected to the pole core by the fit of the threads of the web or fabric into the grooves, notches, serrations or knurl deformations, hereinafter referred to as "surface deformation" of the pole core. The surface deformation of the pole core is preferably so arranged that the grooves and the like cross each other to leave essentially pyramidal-shaped projections between the grooves, knurls, and the like. Upon placing fabric on such a pole core, both the weft as well as warp threads will fit in the depressions formed by the deformation to be mechanically held therein so that, upon subsequent assembly of the winding thereover, the pole core, the threads or yarns of the fabric, and the winding itself will form a complete unit which cannot come apart, even under the most severe shock, vibration, oscillation or temperature variation conditions.

In a preferred form, the connecting web between the deformed cylindrical pole core and the winding is a web or mesh of an open linen weave, similar, for example, to an embroidery fabric base. Such a textile structure, particularly when applied in a few layers or wraps such as two, three wraps or so, effects good electrical insulation between the pole core and the wires forming the field winding.

A fabric made of open-weave linen is particularly preferred; the interfitting of the linen weave fabric with the deformation of the pole core, when additionally pressed thereagainst by the winding placed thereover, results in a unit which is essentially immune to vibration, axial and rotary oscillations and against changes and gradients in temperature, without introducing excessive costs in the manufacture of the structure itself. In a particularly advantageous construction, the rotor is mechanically completely assembled, that is, is furnished with the pole shoes which are arranged in interdigited form, and with the slip rings for connection to the windings, and thereafter is vacuum-impregnated with a suitable impregnating compound, for example a thermosetting resin, as well known in the field of dynamo electric machine construction.

DRAWINGS ILLUSTRATING A PREFERRED EXAMPLE

Figure 2:
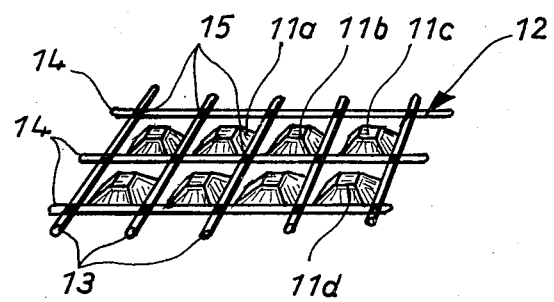

FIG. 1 is a highly schematic longitudinal sectional view through a rotor structure for an interdigited or claw-pole generator with a remote bearing; and FIG. 2 is a perspective view to a highly enlarged scale showing a portion of the surface of the rotor, with the mesh fabric thereon.

The rotor 1 shown in FIG. 1 is of the type particularly adapted for use in a three-phase alternator designed for direct coupling to a rotating shaft in a motorcycle engine. It has a pole core 2, which is generally cylindrical, formed with two axial shoulders 2a, 2b on which interdigited pole shoes 3a, 3b are pushed, and attached in a suitable manner, for example by an interference fit, welding, or the like. The interdigited pole shoes 3a, 3b at opposite axial ends of the core 2 overlap the toroidal field winding 5. They are formed with interdigited claws 6a, 6b; 7a, 7b, fitting over the toroidal winding 5. The toroidal winding 5 is wound on a central portion 4 of the core 2. The rotor structure also includes two slip rings 8a, 8b which are connected to respective winding terminals 9a, 9b of the field winding 5, for engagement with brushes (not shown) to apply direct current to the field winding for energization of the field structure. The slip rings 8a, 8b are fitted on an extended projecting portion, preferably integral with the pole core 2. The core 2 is formed with an inner bore 10, preferably tapered as shown, to receive a matching shaft which is remotely journalled. The bore extends through the pole core to receive a clamping or attachment bolt. Other arrangements to journal the rotor can be made; the overall arrangement and configuration of the rotor structure as such is known and may be in accordance with any well known design.

In accordance with the present invention, the surface of the portion 4 of the rotor core 2 is formed with grooving, rifling, cuts, knurls, or the like, and generally referred to as surface deformations, as best seen in FIG. 2. These deformations are formed in two transverse directions, so that they will cross each other. Preferably, the surface of the cylindrical pole core 2 is so deformed that essentially pyramidal projections will be formed between the respective grooves or depressions resulting from the deformation. FIG. 2 shows a plurality of slight pyramidal projections 11a, 11b . . . 11d with grooves extending in respectively axial and circumferential direction with respect to the rotor pole structure 2. The grooves can, of course, be in different directions, for example extending at 45° with respect to a developed surface of the pole core 2. The result of the deformation is a grid-like surface structure of the pole core. The surface structure can easily be obtained by application of a knurling tool to the cylindrical core structure 2, by milling and turning, or the like. A fabric mesh 12, preferably made of linen yarn or threads, in suitable shape and quantity, is placed over the pole core in such a manner that the respective warp and weft yarns fit between the cylindrical projections 11a, 11b . . . 11d. The transverse threads 14 and the longitudinal threads 15 cross each other, preferably at the intersections of the respective grooves between the pyramidal projections 11a, 11b . . . 11d. Preferably, the threads are connected together at the cross-over points; they can be in accordance with an ordinary weave structure, that is, passing at alternate sides of respective cross threads, or can be laid in form of a grid structure with connections at the intersection. The connections can be formed by an adhesive to be applied later, as will appear. The cross-position of the threads of the web or other textile structure which is applied to the rotor forms a mechanical interengaged connection between the surface structure of the pole core 2 and the open mesh 12 applied thereto. The depth of the grooves in the undeformed surface of the pole core 2, that is, the projection of the pyramidal stubs between the grooves, may be approximately the thickness of the threads 13, 14, or slightly more. In a suitable structure, the projections extend slightly above the first layer of the yarn mesh, and slightly below the second layer of yarn. A plurality of layers of mesh 12 are preferably applied, two to three layers being suitable.

The intermediate mesh structure, that is, the respective layers thereof, are preferably tightly connected with the pole core structure 2 by means of an adhesive, a cement, or other suitable attachment medium.

The field structure 5 is wound over the pole structure 2 after the linen mesh 12, in its respective number of layers, has been applied thereon. The winding 5 is done in customary way, resulting in a tight interlocking connection between at least the innermost layer of the fabric 12 and usually also of the second, and by adhesive connection of the subsequent layer or layers. The deformed surface structure of the pole core 2 will engage in the open mesh between the respective threads of the fabric 12 so that the entire wound pole structure is one unitary whole. The web or mesh 12, with the winding thereon, may additionally be subjected to a dip in an adhesive or the like, or adhesion of the winding to the underlying combination of deformed surface and web 12 may be effected.

After the pole 2, with the winding 5 in the portion 4 thereof, applied over the fabric 12 has been assembled, the interdigited pole shoes 3a, 3b and the slip rings are then applied to the rotor structure, and the entire assembly can be once more subjected to a dip or vacuum impregnation in a suitable impregnating compound, as well known in the field of dynamo electric machine construction.

The mesh web or fabric, preferably an open mesh and suitably being made of a linen canvass, mesh or net structure, is, in accordance with a preferred form and shown in FIG. 1, applied in the web or strip which is somewhat wider than the portion 4 of the pole core, so that it can be overlapped at the side and fit against the inside of the pole shoes 3a, 3b, to provide edge protection for the winding and prevent rubbing of the wires of the winding 5 against the metal pole shoes 3a, 3b. The mesh structure results in interlocked engagement with the pole shoe 2 itself, thereby providing a secure connection between the respective components of the overall rotor structure unit, and tying it together into one integral whole.

The invention has been described in connection with an example of a rotor suitable for use with a motorcycle three-phase alternator. It is equally applicable to other dynamo electric machines, and particularly suitable when vibration, oscillatory loading and shock loading are expected. The basic concept resides in so deforming a usually smooth circular surface of the pole structure by forming grooving, rifling or other deformation in the surface therein, preferably in crossing direction, that a mesh or net web of canvass fabric or the like, preferably of linen fabric, can be applied thereto and results in an interlocked engagement of the individual threads of the fabric or mesh with the deformed surface of the cylindrical pole core itself. Upon application of a winding thereover, the connection between the fabric web and the pole core will result in an interlocked engagement between the threads or yarns of the web and the surface of the pole core, as well as interlocking effects between the respective windings of the field with adjacent portions of the web which, and particularly after encapsulation, for example by vacuum impregnation, will form an integrated, unitary rotor structure, the separate components of which are held together in fixed relationship, even under substantial vibration or oscillatory loading.

Various changes and modifications may be made within the scope of the inventive concept.

I claim:

1. Rotor structure for dynamo electric machines, particularly for such machines subject to oscillatory, vibratory, shock or temperature change effects, comprising a cylindrical pole core (2, 4);

a plurality of axially located, radially projecting claw pole shoes (3a, 3b);

and a winding (5) wound on the cylindrical core, wherein, in accordance with the invention, at least the portion (4) of the pole core on which the winding is placed is formed with surface deformations in the form of grooves, notches or knurls, and leaving projections (11a, 11b . . . 11d) between the deformations;

and a layer (12) of mesh or net structure insulating fabric material positioned over the surface including said deformations, the winding (5) being located over said fabric layer (12).

2. Structure according to claim 1, wherein the deformations extend in crossing direction.

3. Structure according to claim 2, wherein the projections (11a, 11b . . . 11d) between the deformations form a plurality of rows of essentially pyramidal shape.

4. Structure according to claim 2, wherein the mesh or net structure insulating fabric material includes crossing yarns or threads (13, 14) fitting into the deformations.

5. Structure according to claim 4, wherein the threads or yarns forming said mesh or net structure insulating fabric material are mechanically interlocked by the projections located between the deformations, said projections fitting between the pores or spaces between the individual yarns or threads forming said mesh or net structure fabric material.

6. Structure according to claim 4, wherein said fabric material comprises a linen weave material.

7. Structure according to claim 1, wherein said layer of mesh or net structure insulating fabric material comprises a plurality of superimposed wraps of said material.

8. Structure according to claim 6, wherein said layer of mesh or net structure insulating fabric material comprises a plurality of superimposed wraps of said material.

9. Structure according to claim 1, further including an adhesive connecting the mesh or net structure insulating fabric material to the surface of the pole core including said deformations.

10. Structure according to claim 8, further including an adhesive connecting the mesh or net structure insulating fabric material to the surface of the pole core including said deformations.

11. Structure according to claim 1, further including an impregnating material impregnating the cylindrical pole core (2, 4), the claw pole shoes (3a, 3b), the winding (5) and the layer (12) of fabric material to form a unitary composite rotor.

12. Structure according to claim 10, further including an impregnating material impregnating the cylindrical pole core (2, 4), the claw pole shoes (3a, 3b), the winding (5) and the layer (12) of fabric material to form a unitary composite rotor.

13. Structure according to claim 1, wherein the mesh or net structure insulating fabric material comprises a web which is wider than the axial length of said winding, the portion of said web extending beyond said winding being folded over the axial ends of said winding (5) and protecting the ends of said winding from contact with the claw pole shoes while being held in position with respect to the winding by interlocking engagement with said deformations and projections, respectively.

14. Structure according to claim 12, wherein the mesh or net structure insulating fabric material comprises a web which is wider than the axial length of said winding, the portion of said web extending beyond said winding being folded over the axial ends of said winding (5) and protecting the ends of said winding from contact with the claw pole shoes while being held in position with respect to the winding by interlocking engagement with said deformations and projections, respectively.

15. Structure according to claim 7, wherein the height of the projections is between the thickness of two superimposed adjacent wraps of material.

16. Structure according to claim 7, wherein the height of the projections is between the thickness of the wrap of material adjacent the core and the next adjacent wrap.

* * * * *